United States Patent [19]

Stolzer

[11] 4,359,922
[45] Nov. 23, 1982

[54] GUIDE ARRANGEMENT FOR THE SAW FRAME OF A MECHANICAL FRAME SAW

[75] Inventor: Paul Stolzer, Achern, Fed. Rep. of Germany

[73] Assignee: KEURO Maschinenbau Gesellschaft mit beschränkter Haftung & Co. Kommanditgesellschaft, Achern-Gamshurst, Fed. Rep. of Germany

[21] Appl. No.: 245,029

[22] Filed: Mar. 18, 1981

[30] Foreign Application Priority Data

May 2, 1980 [DE] Fed. Rep. of Germany ....... 3016864

[51] Int. Cl.³ .............................................. B23D 49/04
[52] U.S. Cl. ......................................... 83/759; 83/786
[58] Field of Search .................. 83/759, 786, 771, 746

[56] References Cited

U.S. PATENT DOCUMENTS 926,802  7/1909  Berry ................................... 83/759
1,661,217  3/1928  Farrell ............................ 83/786 X Primary Examiner—Frank T. Yost
Attorney, Agent, or Firm—Spencer & Kaye

[57] ABSTRACT

A light-weight and structurally simple system for guiding the saw frame of a mechanical frame saw machine having a crank drive and a stationary machine frame on which the system is pivotally mounted. The system is composed of a vertically extending, flat inner guide plate pivotally mounted to the machine frame and carrying bearings mounted on bolts, and a guide part having the form of a plate, attached to the saw frame back, and provided with a laterally extending guide surface which bears against the guide plate and slides therealong during movement of the guide part relative to the guide plate, the guide part being provided with a vertical guide groove located, in the horizontal direction, midway between the ends of the guide part for engagement by the machine crank drive, and with two horizontal guide grooves presenting horizontal guide faces and extending in respectively opposite horizontal directions from respectively opposite ends of the vertical groove, the horizontal grooves and their associated guide faces engaging the bearings of the guide plate to be supported thereby. The guide part is provided, at the lateral side thereof which faces away from the guide plate, with at least one further guide surface extending parallel to the guide plate, and the system is further provided with a guide beam carried by the bolts to bear against the further guide surface in a manner to brace the guide part relative to the guide plate.

8 Claims, 7 Drawing Figures

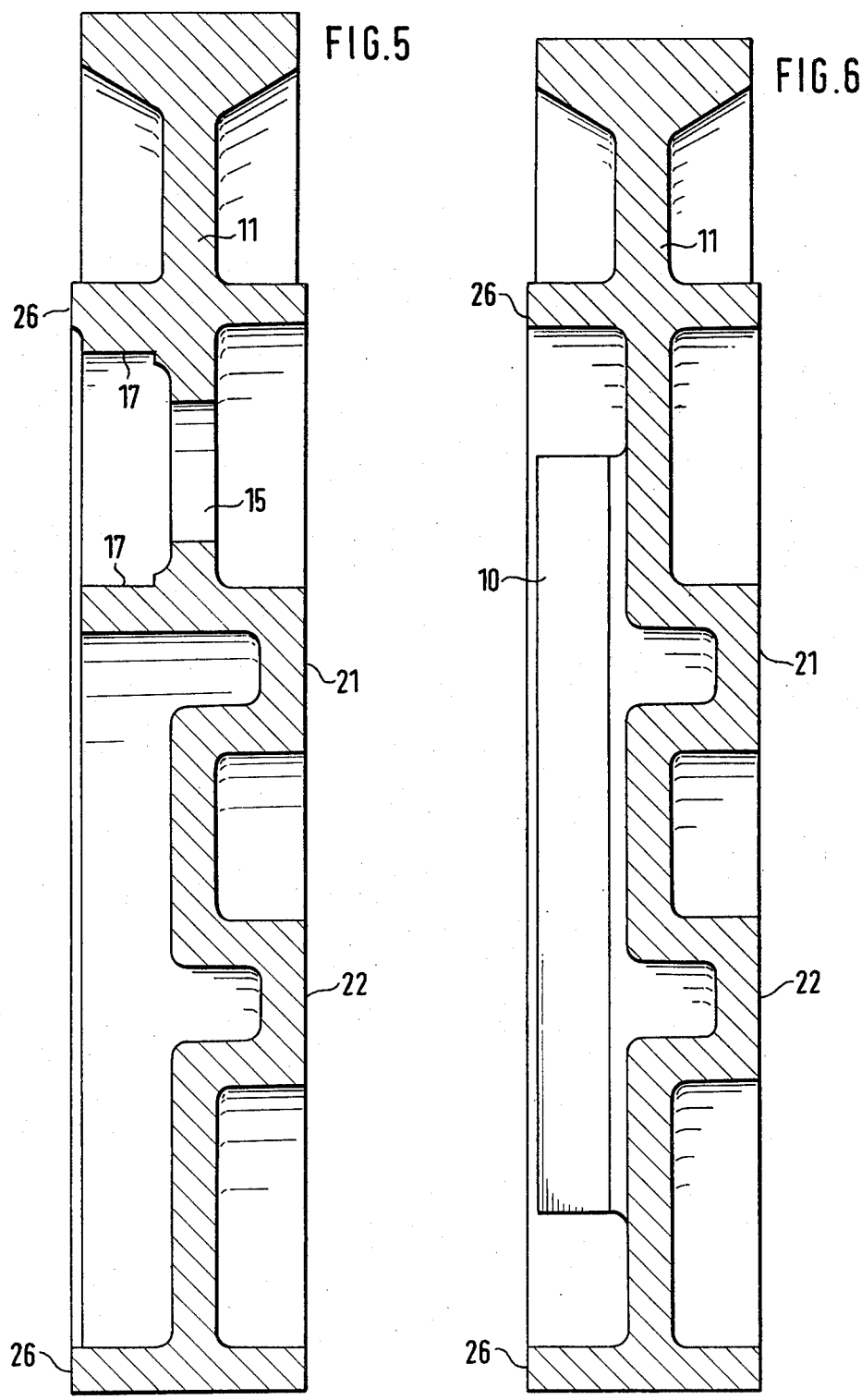

GUIDE ARRANGEMENT FOR THE SAW FRAME OF A MECHANICAL FRAME SAW

BACKGROUND OF THE INVENTION

The present invention relates to a guide arrangement for the saw frame of a mechanical frame saw of the type in which the saw frame guide is mounted pivotably on the stationary machine frame.

In a machine of this type, the saw frame guide includes a vertically extending flat inner guide plate on which the guide part of the saw frame slides. The guide part is in the form of a plate adjoining the rear end of the saw frame back, and slides on the guide plate via laterally protruding guide faces. Further, the guide part is provided midway, in the horizontal direction, between its ends with a vertical guide groove for the engagement of the crank pin of the crank drive for the saw frame. The guide part is additionally provided, both ahead of and behind the vertical guide groove, in the direction of the stroke of the saw frame, with respective guide grooves with horizontal guide faces by means of which the guide part is supported against slide blocks, rolling bearings or the like, carried by bolts secured to the guide plate and extending horizontally through the guide part.

Such a guide arrangement is generally known and has been in use fundamentally in mechanical frame saws at least in the last decades. Here, parallel with the inner guide plate on the other side of the guide part, there is disposed an outer guide plate which is set upon the ends of the bolts protruding through the guide part. This known guide arrangement gives the saw frame the requisite security against tilting, over its entire stroke, both in the vertical and in the horizontal direction, so that clean vertical cuts result in the worked stock, with each cut producing waste equal to practically only the thickness of the saw blade and with most extensive preservation of the saw blade.

However, this known guide arrangement is extremely solid and heavy on account of the demands made of it, which signifies corresponding high material costs. The cleaning of the saw frame guide as a whole is also complicated, because the outer guide plate must always first be removed for cleaning and in its refitting trained personnel and great care are necessary to restore the exact guidance properties for the saw frame.

SUMMARY OF THE INVENTION

It is an object of the present invention, at least for mechanical frame saws of the lower and medium power ranges, to provide a novel guide arrangement which is lighter and requires considerably less material than known arrangements, is no longer dependent upon specialized personnel for cleaning and servicing, and thus is simplified and considerably less costly.

Another object is to construct such an improved arrangement in a simple manner so that the manufacturing costs therefor can be diminished considerably.

The above and other objects are achieved, according to the invention, in a system for guiding the saw frame of a mechanical frame saw machine having a crank drive and a stationary machine frame on which the system is pivotally mounted, the saw frame having a front and a back, and the system being composed of a vertically extending, flat inner guide plate pivotally mounted to the machine frame and carrying bearings mounted on bolts, and a guide part having the form of a plate, attached to the saw frame back, and provided with a laterally extending guide surface which bears against the guide plate and slides therealong during movement of the guide part relative to the guide plate, the guide part being provided with a vertical guide groove located, in the horizontal direction, midway between the ends of the guide part for engagement by the machine crank drive, and with two horizontal guide grooves presenting horizontal guide faces and located at respectively opposite sides of the vertical groove, the horizontal grooves and their associated guide faces engaging the bearings of the guide plate to be supported thereby, by arranging the horizontal guide grooves so that one of them extends from the vertical groove in the direction of cutting movement of the saw frame and is located at the height of the upper end of the vertical groove, and the other of them extends from the vertical groove in the direction of return movement of the saw frame and is located at the height of the lower end of the vertical groove, providing the guide part, at the lateral side thereof which faces away from the guide plate, with at least one further guide surface extending parallel to the guide plate and having a length corresponding to the saw frame stroke, and further providing a guide beam carried by the bolts to bear against the further guide surface in a manner to brace the guide part relative to the guide plate.

With these features of the invention, the hitherto necessary large and heavy outer guide plate can be eliminated since it is replaced by the relatively narrow guide beam extending obliquely in relation to the vertical and horizontal directions, the respective ends of which beam are connected with the bolts extending through the guide part. It has surprisingly been found that the arrangement, in accordance with the invention, of the horizontal guide grooves, and the resultant oblique arrangement of the guide beam, gives the saw frame adequate security against tilting in the vertical and horizontal directions. Moreover now the horizontal guide grooves and the guides arranged on the side of the guide part remote from the guide plate are readily accessible from the slide remote from the guide plate, so that these parts can be cleaned easily and without dismantling.

As a whole the structure is substantially lighter than the prior art, which has a favorable effect upon the pivoting movements of the saw frame during the working procedure, due to reduced acceleration forces. Moreover, the style of construction according to the invention is considerably more compact, cheaper and simpler than the prior art, since it allows only a few parts to suffice.

It has proved advantageous to provide the guide part, on the side thereof remote from the guide plate, with mutually parallel upper and lower guide faces. The upper guide face is arranged directly beneath the forward horizontal guide groove and extends rearwardly from the forward end thereof to a location beyond the rear end of that guide groove. The lower guide face is arranged directly above the rear horizontal guide groove and extends forwardly from the rear end of that groove to a location beyond the forward end of the rear guide groove. Each guide face is of a length to bear against the guide beam over the entire saw frame stroke.

Thus the guide part is supported on the side remote from the guide plate at two points with considerable spacing, against the guide beam, which offers an optimum of security againt tilting. It is here advantageous for the guide faces to be connected in one piece with the guide part, that is together with the guide part they constitute a molding-out of the saw frame, which ordinarily forms a casting.

It is also expedient for the vertical guide groove of the guide part to be arranged, without piercing of the guide part, exclusively on the side of the latter facing the guide plate, and for the guide faces of the horizontal guide grooves of the guide part to be arranged exclusively on its side facing the guide plate, integrally connected with the guide part. Thus the guide part acquires optimum stability and can be of correspondingly light formation as regards its other walls.

In this connection, it is advantageous for the guide face of the guide part in contact with the guide plate to surround the guide part along its circumferential contour and to protrude horizontally in the direction towards the guide plate beyond the guide faces of the vertical and horizontal guide grooves. Thus the object is achieved that, firstly, the guide part receives its best possible securing against tilting in relation to the guide plate and second, the guide plate does not need to be provided with recesses of any kind for the guide faces of the vertical and horizontal guide grooves, and thus can be produced as a simple flat part.

Finally, for security against soiling, a housing of light metal or synthetic plastic material, which is simple and inexpensive to produce and does not appreciably influence the weight of the guide arrangement of the saw frame, can be fitted on the side of the guide part remote from the guide plate.

BRIEF DESCRIPTION OF THE DRAWING

FIGS. 5, 6 and 7 are cross-sectional views along the section lines V—V, VI—VI and VII—VII, respectively, of FIG. 3.

DESCRIPTION OF THE PREFERRED EMBODIMENTS

Figure 1:
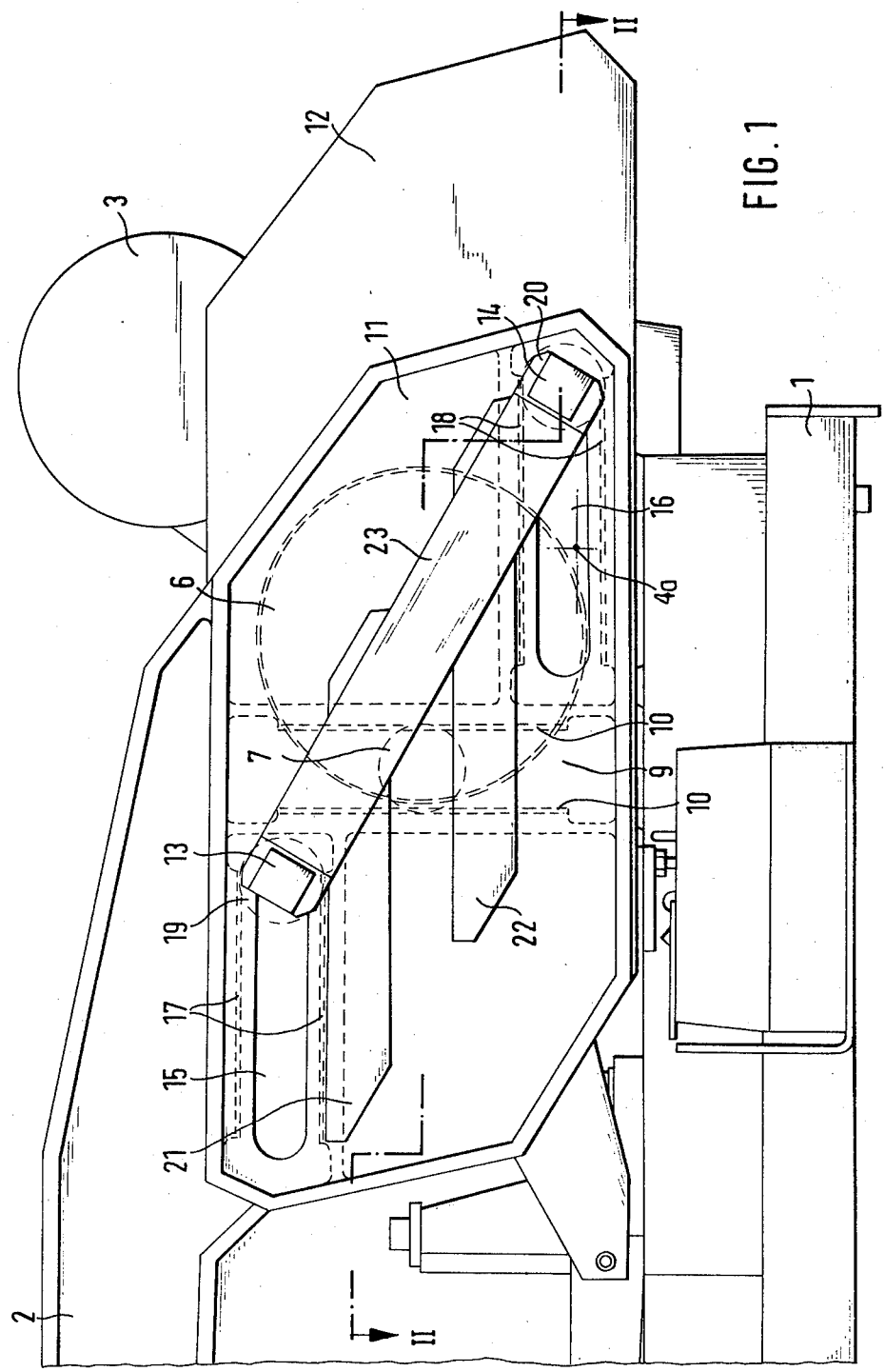
FIG. 1 is a side elevational view of a preferred embodiment of a guide arrangement according to the invention for the saw frame of a mechanical frame saw, viewed from the side remote from the inner guide plate and with a cover plate removed.
Figure 2:
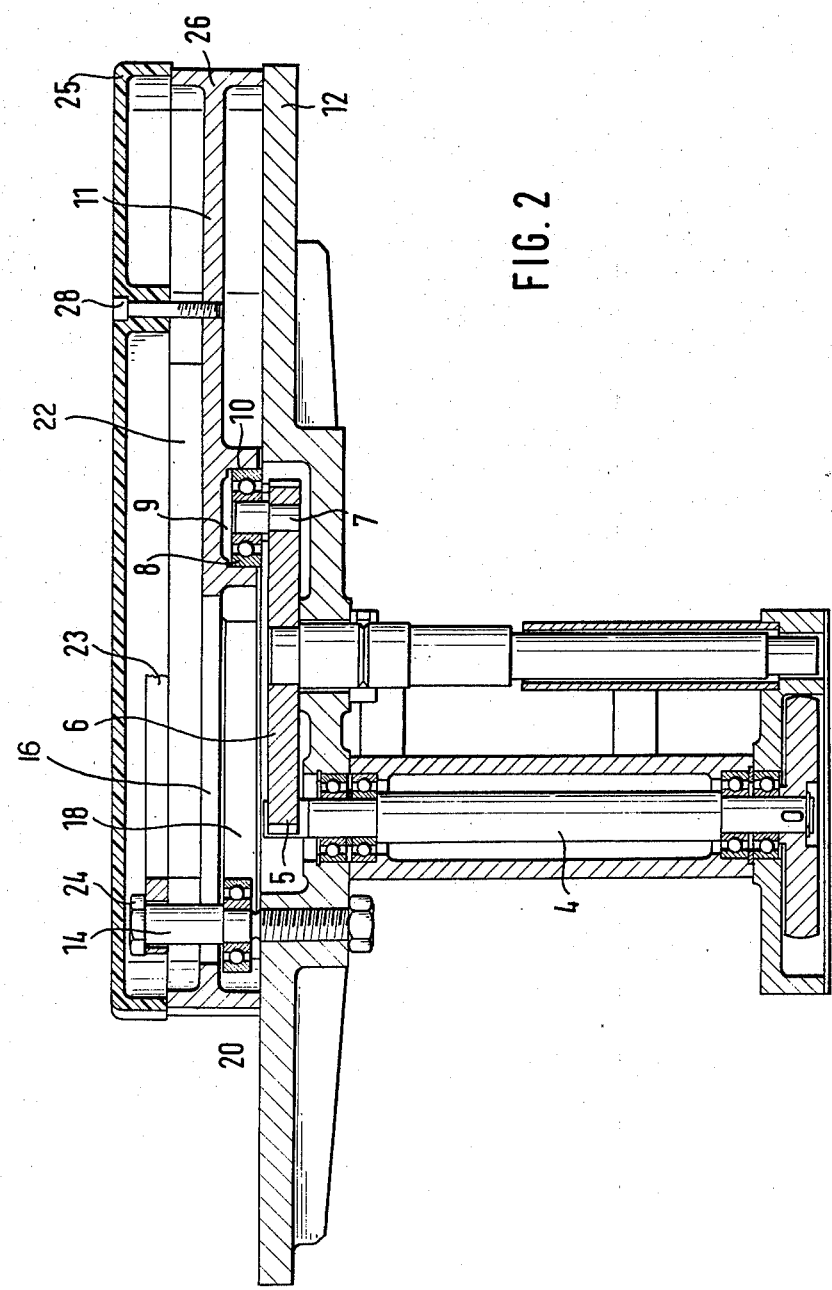
FIG. 2 is a cross-sectional detail view along the section line II—II of FIG. 1.

FIGS. 1 and 2 show a machine frame 1 on which is pivotally mounted a saw frame 2 together with its drive motor 3 and an arrangement for its rearward guidance. The axis at which saw frame 2 is pivotally mounted on machine frame 1 is designated with 4a, the axis of shaft 4 in FIG. 2.

The drive motion produced by the drive motor 3 passes by way of a shaft 4 and a pinion 5 to the toothed periphery of a crank gear wheel 6 which carries a crank pin 7. Pin 7 engages through an anti-friction bearing 8 in a vertical guide groove composed of an aperture 9 and vertical guide faces 10 and located in the guide part 11 at the back of the saw frame 2.

The guide arrangement for the saw frame 2 starts from an inner guide plate 12 in which the shaft 4 and the crank gear wheel 6 are rotatably mounted. Secured on the guide plate 12 are bolts 13 and 14 which extend through the guide part 11 by way of horizontal apertures 15 and 16. Above and below each aperture 15, 16, and at the side of part 11 facing the guide plate 12 there are horizontal guide faces 17 and 18, respectively, which are in engagement with anti-friction bearings 19 and 20 rotatably seated on the bolts 13 and 14. Each aperture 15, 16, and its associated guide faces 17 or 18 constitute a horizontal guide groove.

The horizontal guide grooves 15, 17 and 16, 18 are so arranged that the forward horizontal guide groove 15, 17 extends from the upper end of the vertical guide groove 9 in the direction of forward movement of the saw frame, while the rear horizontal guide groove 16, 18 extends from the lower end of the vertical guide groove 9 in the direction of backward, or return, movement of the saw frame.

On the side remote from the guide plate 12, the guide part 11 carries two projections defining vertical guide faces 21 and 22 parallel to the guide grooves 15, 17 and 16, 18, respectively. The guide face 21 extends from the forward end of the guide groove 15, 17 in the direction opposite to the saw frame stroke to a distance beyond the rear end of groove 15, 17. The guide face 22 extends from the rear end of the guide groove 16, 18 in the direction of the saw frame stroke to a distance beyond the forward end of groove 16, 18. The guide faces 21 and 22 are in abutment against a hardened guide beam 23 which is supported via its ends at the free ends of the bolts 13 and 14, to which beam 23 is made fast with nuts 24.

As may be seen from FIG. 2, a hood, or cover plate, 25 is also set over the guide arrangement. Hood 25 is removed in FIG. 1 to permit illustration of the interior components.

Figure 3:
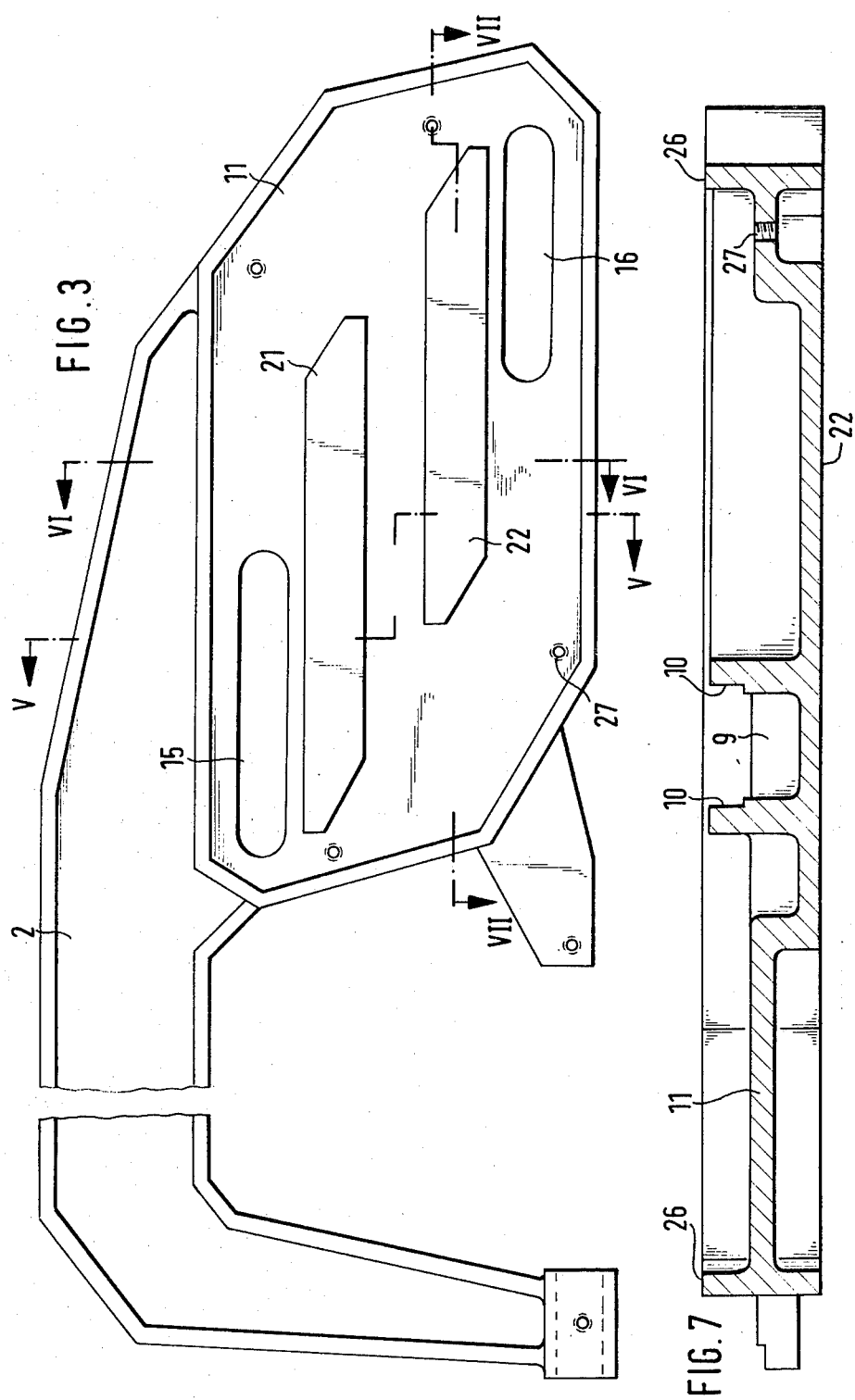
FIG. 3 is a side elevational view of the saw frame with the guide part of FIG. 1, viewed in the same direction as FIG. 1.
Figure 4:
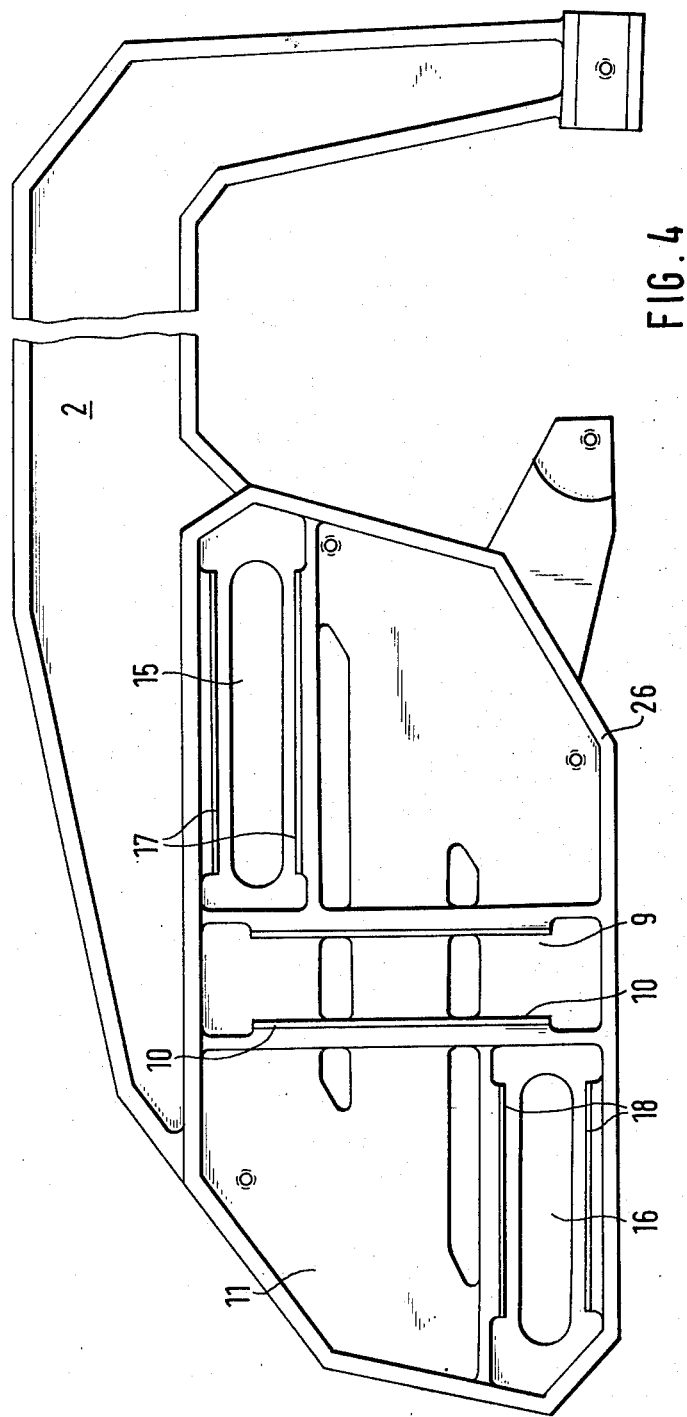
FIG. 4 is a side elevational view of the saw frame according to FIG. 3, viewed in the opposite direction.

FIGS. 3 and 4 show the saw frame 2 in isolation, with FIG. 3 being a view in the same direction as FIG. 1 and FIG. 4 being a view in the opposite direction. FIGS. 3 and 4 show especially well that the guide part 11 is guided along the guide plate 12 by means of a guide face 26 in the form of a flange embracing the outer contour of the guide part 11 and protruding horizontally and laterally beyond the guide faces 10, 17 and 18 in the direction towards the guide plate 12. Guide part 11 is also guided by frictional engagement of beam 23 against guide faces 21 and 22. Moreover FIG. 3 shows several threaded bores 27 in which screws 28 engage to secure hood 25 to guide part 11.

FIGS. 5 to 7 are cross-sectional views of the saw frame with guide part 11 taken along corresponding cross section lines on FIG. 3. All parts shown and identified by reference numerals in FIGS. 5 to 7 have already been described.

As metal for the guide beam 23 there can be used hardened steel, and as material for the housing part 25 aluminium or glass- reinforced polyester.

It will be understood that the above description of the present invention is susceptible to various modifications, changes and adaptations, and the same are intended to be comprehended within the meaning and range of equivalents of the appended claims.

What is claimed is:

1. In a system for guiding the saw frame of a mechanical frame saw machine having a crank drive and a stationary machine frame on which the system is pivotally mounted, the saw frame having a front and a back, and the system being composed of a vertically extending, flat inner guide plate pivotally mounted to the machine frame and carrying bearings mounted on bolts, and a guide part having the form of a plate, attached to the saw frame back, and provided with a laterally extending guide surface which bears against the guide plate and slides therealong during movement of the guide part relative to the guide plate, the guide part being provided with a vertical guide groove located, in the horizontal direction, midway between the ends of the guide part for engagement by the machine crank drive, and with two horizontal guide grooves presenting horizontal guide faces and located at respectively opposite sides of the vertical groove, the horizontal grooves and their associated guide faces engaging the bearings of the guide plate to be supported thereby, the improvement wherein:

one of said horizontal guide grooves extends from said vertical groove in the direction of cutting movement of the saw frame and is located at the height of the upper end of said vertical groove, and the other of said horizontal guide grooves extends from said vertical groove in the direction of return movement of the saw frame and is located at the height of the lower end of said vertical groove;

said guide part is provided, at the lateral side thereof which faces away from said guide plate, with at least one further guide surface extending parallel to said guide plate and having a length corresponding to the saw frame stroke; and said system further comprises a guide beam carried by said bolts to bear against said further guide surface in a manner to brace said guide part relative to said guide plate.

2. An arrangement as defined in claim 1 wherein said guide part is provided with two said further guide surfaces, which are parallel to one another, are vertically spaced apart and are disposed symmetrically with respect to said horizontal grooves, with the upper one of said guide surfaces being disposed immediately below said one horizontal groove and extending from the forward end thereof in the direction of return movement of the saw frame to beyond the rear end of said one horizontal groove, and the lower one of said guide surfaces being disposed immediately above said other horizontal groove and extending from the rear end thereof in the direction of forward movement of the saw frame to beyond the forward end of said other horizontal groove.

3. An arrangement as defined in claim 1 or 2 wherein said guide faces and guide surfaces are integral with said guide part.

4. An arrangement as defined in claim 1 wherein said guide beam is of hardened metal, and further comprising nuts securing said beam to the free ends of said bolts.

5. An arrangement as defined in claim 1 wherein said vertical guide groove is formed to not extend through said guide part and is located exclusively at the side of said guide part facing said guide plate.

6. An arrangement as defined in claim 1 wherein said guide faces of said horizontal guide grooves are arranged exclusively on the side of said guide part facing said guide plate and are integral with said guide part.

7. An arrangement as defined in claim 1 wherein said vertical guide groove presents vertical guide faces for engaging the machine crank drive, and said guide surface of said guide part which bears against said guide plate borders said guide part along its circumferential contour and protrudes horizontally in the direction towards said guide plate beyond said guide faces of said vertical and horizontal guide grooves.

8. An arrangement as defined in claim 1 further comprising a housing part of light metal or synthetic plastic mounted on the side of said guide part remote from said guide plate.

* * * * *